United States Patent
Mizutani et al.

(10) Patent No.: US 7,608,966 B2
(45) Date of Patent: Oct. 27, 2009

(54) ROTOR AND METHOD OF MANUFACTURING

(75) Inventors: Tatsuhiko Mizutani, Toyota (JP); Toshiya Sugiyama, Toyota (JP); Eiji Maeda, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 9 days.

(21) Appl. No.: 11/667,878

(22) PCT Filed: Jan. 30, 2006

(86) PCT No.: PCT/JP2006/001917

§ 371 (c)(1),
(2), (4) Date: May 16, 2007

(87) PCT Pub. No.: WO2006/090567

PCT Pub. Date: Aug. 31, 2006

(65) Prior Publication Data

US 2007/0290566 A1    Dec. 20, 2007

(30) Foreign Application Priority Data

Feb. 22, 2005   (JP)   ............... 2005-046033

(51) Int. Cl.
*H02K 21/12* (2006.01)
(52) U.S. Cl. ............................... 310/156.53
(58) Field of Classification Search ........... 310/156.01–156.84
See application file for complete search history.

(56) References Cited

U.S. PATENT DOCUMENTS

| 5,402,025 A | 3/1995 | Saito et al. |
| 2007/0205686 A1* | 9/2007 | Ishida ................. 310/156.21 |

FOREIGN PATENT DOCUMENTS

| EP | 0 712 198 A1 | 5/1996 |
| EP | 1 265 338 A2 | 12/2002 |
| JP | 05-083904 A | 4/1993 |
| JP | 06-006960 A | 1/1994 |
| JP | 07-298566 A | 11/1995 |
| JP | 2000-069727 A | 3/2000 |
| JP | 2001-061261 A | 3/2001 |
| JP | 2002-364541 A | 12/2002 |
| JP | 2003-199303 A | 7/2003 |

* cited by examiner

*Primary Examiner*—Nguyen N Hanh
(74) *Attorney, Agent, or Firm*—Kenyon & Kenyon LLP

(57) ABSTRACT

A rotor includes a rotor core, a permanent magnet inserted into an opening formed along a circumferential direction of the rotor core, and end plates provided to sandwich the rotor core in a direction of a rotation axis. The permanent magnet is fixed to the rotor core with an adhesive. A stainless steel plate is provided between the rotor core and each of the end plates, the stainless steel plate having a linear expansion coefficient falling between that of the rotor core and that of the end plates. An outer periphery of each of the end plates in a circumferential direction has a portion placed to be radially inward with respect to an outer periphery of the stainless steel plate.

9 Claims, 6 Drawing Sheets

VIEW IN DIRECTION OF ARROW A

VIEW IN DIRECTION OF ARROW A

FIG. 7A
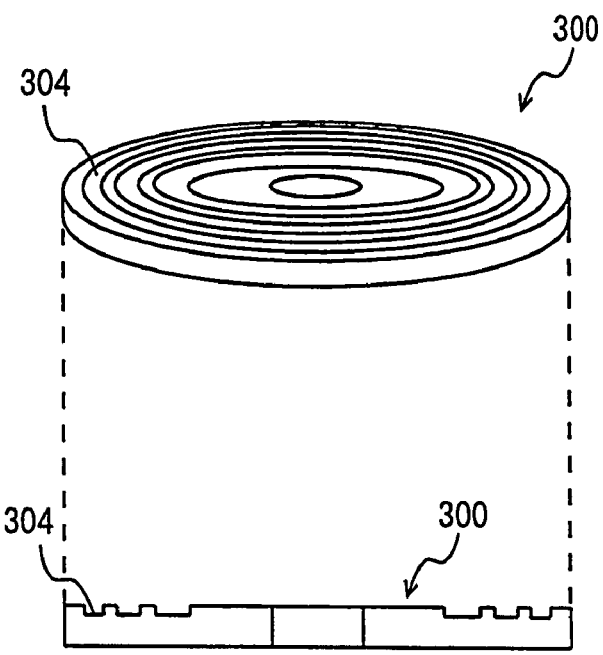
FIG. 7B
FIG. 8
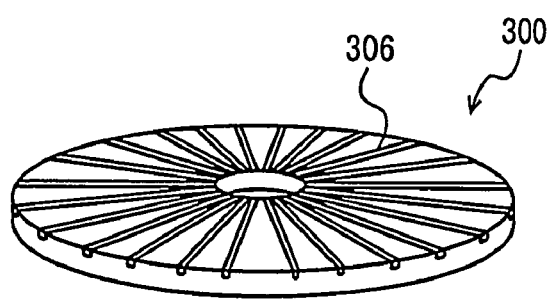

ROTOR AND METHOD OF MANUFACTURING

This is a 371 national phase application of PCT/JP2006/301917 filed 30 Jan. 2006, which claims priority of Japanese Patent Application No. 2005-046033 filed 22 Feb. 2005, the contents of which are incorporated by reference.

TECHNICAL FIELD

The present invention relates to a structure of a rotor in a rotating electrical machine and a method of manufacturing the rotor, and particularly to a structure of a rotor having a permanent magnet fixed to a rotor core with an adhesive and a method of manufacturing the rotor.

BACKGROUND ART

In a rotating electrical machine conventionally made of a rotor and a stator, the stator is formed of a stator core having a plurality of slots formed therein, and a coil wound around teeth provided between the slots, while the rotor is formed of a rotor core made of a plurality of stacked magnetic steel sheets, a magnetized permanent magnet, and a shaft serving as a rotating shaft. When power is supplied to the coil, a magnetic field is generated. Based on the generated magnetic field, a magnetic flux flows between the rotor and the stator, and thereby the rotor obtains turning force. The permanent magnet is inserted into an opening provided in the rotor core to be fixed to the rotor core with an adhesive. End plates are provided to sandwich the rotor core in a direction of a rotation axis of the rotor.

As to the rotating electrical machine with such a structure, Japanese Patent Laying-Open No. 2003-199303, for example, discloses a method of manufacturing a motor, the method ensuring the strength of an embedded magnet rotor, maintaining the property of the motor, and allowing a permanent magnet to be coated. The method of manufacturing a motor shows a method of manufacturing a motor formed of a stator and a permanent magnet rotor. The permanent magnet rotor is made such that an approximately cylindrical rotor core made of a material having a high magnetic permeability, such as iron, is provided with a plurality of holes each penetrating the rotor core in its axial direction for embedding a permanent magnet, and that a permanent magnet is then embedded in each of the plurality of holes. This motor rotates owing to a rotating magnetic field generated by a current flowing through a wire provided at the stator. In the method of manufacturing the motor, a permanent magnet is directly coated with an adhesive, and thereafter bonded to the rotor core.

According to the method of manufacturing the motor disclosed in the above-described document, the permanent magnet can be fixed inside the rotor core, prevented from being detached and scattered during high-speed operation, and insulated at the same time.

However, when an adhesive is used to fix a permanent magnet to a rotor core, the adhesive may ooze to be interposed between the rotor core and each of end plates. If an adhesive is interposed between the rotor core and each of the end plates, relative motion between the rotor core and each of the end plates is restricted. Since the rotor core and the end plates are made of different materials, they have different linear expansion coefficients. The ambient temperature and heat generated as the rotating electrical machine operates cause the end plates and the rotor core to expand individually. Since the rotor core and the end plates have different linear expansion coefficients, the rotor core and the end plates change by different amounts. Consequently, compressive stress or tensile stress may originate at the rotor core along a radial direction from a portion fixed with an adhesive between the rotor core and each of the end plates. Therefore, if the rotor core is made of a plurality of stacked magnetic steel sheets, for example, a magnetic steel sheet placed at an end in an axial direction may deform.

In the method of manufacturing the motor disclosed in the above-described document, an adhesive is used to fix a permanent magnet to a rotor core, which may cause the problems above.

DISCLOSURE OF THE INVENTION

An object of the present invention is to provide a structure of a rotor in a rotating electrical machine, the structure reducing stress attributable to an adhesive interposed between a rotor core and each of end plates.

Another object of the present invention is to provide a structure of a rotor in a rotating electrical machine, the structure being capable of preventing an intermediate member from being mounted in an incorrect manner.

Still another object of the present invention is to provide a method of manufacturing a rotor, the method reducing stress attributable to an adhesive interposed between a rotor core and each of end plates.

A structure of a rotor in a rotating electrical machine according to an aspect of the present invention is a structure of a rotor in a rotating electrical machine having the rotor and a stator. The rotor includes a rotor core, a permanent magnet inserted into an opening formed along a circumferential direction of the rotor core, and end plates provided to sandwich the rotor core in a direction of a rotation axis. The permanent magnet is fixed to the rotor core with an adhesive. An intermediate member is provided between the rotor core and each of the end plates, the intermediate member having a linear expansion coefficient falling between a linear expansion coefficient of the rotor core and a linear expansion coefficient of the end plates. An outer periphery of each of the end plates in the circumferential direction has a portion placed to be radially inward with respect to an outer periphery of the intermediate member.

According to the present invention, an intermediate member is provided between the rotor core and each of the end plates, and owing to the intermediate member, an adhesive oozing from the rotor core does not attach to each of the end plates. It is therefore possible to prevent the rotor core from being bonded to each of the end plates. Furthermore, the intermediate member has a linear expansion coefficient falling between that of the rotor core and that of the end plates. Therefore, even if the ambient temperature and heat generated as the rotating electrical machine operates cause the intermediate member to expand, the intermediate member undergoes a smaller amount of expansion than the end plates. Therefore, even if the rotor core and the intermediate member are relatively positioned with an adhesive, it is possible to reduce compressive stress or tensile stress in a radial direction caused by a difference in linear expansion coefficient. As a result, if the rotor core is formed of a plurality of stacked magnetic steel sheets, for example, it is possible to prevent deformation of a magnetic steel sheet placed at an end in an axial direction. Furthermore, an outer periphery of each of the end plates in a circumferential direction has a portion placed to be radially inward with respect to an outer periphery of the intermediate member. It is therefore possible to check if the intermediate member is provided or not between the rotor core and each of the end plates even if the end plates has been mounted to the rotor core. As such, it is possible to provide a structure of a rotor in a rotating electrical machine, the structure preventing the intermediate member to be mounted in an incorrect manner, and reducing stress attributable to an adhesive interposed between the rotor core and each of the end plates.

Preferably, the intermediate member is disc-shaped. An outer diameter of the intermediate member is set such that the intermediate member extends beyond an outer peripheral position of the opening.

According to the present invention, an outer diameter of the disc-shaped intermediate member is set such that the intermediate member extends beyond an outer peripheral position of the opening. Since the opening is covered with the intermediate member, it is possible to prevent an adhesive that has oozed from the rotor core from attaching to each of the end plates, and consequently it is possible to prevent each of the end plates from being bonded to the rotor core.

Preferably, the intermediate member is a non-magnetic substance.

According to the present invention, the intermediate member is a non-magnetic substance, and thereby it is possible to prevent losses of a magnetic circuit due to magnetic flux leakage, in a direction parallel to a rotation axis, of the permanent magnet provided at the rotor core.

More preferably, the intermediate member is formed of stainless steel.

According to the present invention, the intermediate member is formed of stainless steel, namely, a non-magnetic substance, and thereby it is possible to prevent losses of a magnetic circuit due to magnetic flux leakage, in a direction parallel to a rotation axis, of the permanent magnet provided at the rotor core.

More preferably, a film (e.g. coating) is formed at least at a surface of the intermediate member on a side where the rotor core is placed, a coefficient of friction of the film against the adhesive being smaller than a coefficient of friction of the intermediate member against the adhesive.

According to the present invention, a film is formed at least at a surface of the intermediate member on a side where the rotor core is placed, a coefficient of friction of the film against the adhesive being smaller than that of the intermediate member against the adhesive. Adhesive force of the adhesive to the intermediate member is therefore reduced, and thus stress caused by bonding between the intermediate member and the rotor core can be reduced.

A structure of a rotor in a rotating electrical machine according to another aspect of the present invention is a structure of a rotor in a rotating electrical machine having the rotor and a stator. The rotor includes a rotor core, a permanent magnet inserted into an opening formed along a circumferential direction of the rotor core, and end plates provided to sandwich the rotor core in a direction of a rotation axis. The permanent magnet is fixed to the rotor core with an adhesive. Each of the end plates has a surface facing the rotor core and having a convexo-concave portion.

According to the present invention, each of the end plates has a surface facing the rotor core and having a convexo-concave portion, and thereby a contact area between each of the end plates and the rotor core can be reduced. Therefore, even if the end plates are fixed to the rotor core with an adhesive, the contact area therebetween is reduced, and hence it is possible to reduce an area where each of the end plates and the rotor core are bonded together. Reduction in area where each of the end plates and the rotor core are bonded together leads to reduction in adhesive force between each of the end plates and the rotor core. It is therefore possible to reduce compressive stress or tensile stress in a radial direction caused by difference in linear expansion coefficient between the end plates and the rotor core both expanding with the ambient temperature and heat generated as a rotating electrical machine operates. Consequently, if the rotor core is formed of a plurality of stacked magnetic steel sheets, for example, it is possible to prevent deformation of a magnetic steel sheet placed at an end in an axial direction. As such, it is possible to provide a structure of a rotor in a rotating electrical machine, the structure reducing stress attributable to an adhesive interposed between the rotor core and each of the end plates.

Preferably, each of the end plates is a non-magnetic substance.

According to the present invention, each of the end plates is a non-magnetic substance, and thereby it is possible to prevent losses of a magnetic circuit due to magnetic flux leakage, in a direction parallel to a rotation axis, of the permanent magnet provided at the rotor core.

More preferably, the rotor core is formed of a plurality of stacked magnetic steel sheets.

According to the present invention, the present invention is applied to a rotor core formed of a plurality of stacked magnetic steel sheets to reduce stress attributable to an adhesive interposed between the rotor core and each of the end plates. It is thereby possible to prevent deformation of a magnetic steel sheet placed at an end in an axial direction.

More preferably, the opening is a pair of openings provided to be V-shaped.

According to the present invention, the present invention is applied to a rotor core having a pair of openings provided to be V-shaped to reduce stress attributable to an adhesive interposed between the rotor core and each of the end plates. It is therefore possible to prevent deformation of the rotor core.

More preferably, the opening is a pair of openings each provided along a direction orthogonal to a radial direction.

According to the present invention, the present invention is applied to a rotor core having a pair of openings each provided along a direction orthogonal to a radial direction to reduce stress attributable to an adhesive interposed between the rotor core and each of the end plates. It is therefore possible to prevent deformation of the rotor core.

A method of manufacturing a rotor according to an aspect of the present invention is a method of manufacturing a rotor in a rotating electrical machine. The method of manufacturing a rotor includes the steps of: inserting a permanent magnet into an opening formed along a circumferential direction of a rotor core; applying a thermosetting adhesive to the opening in the rotor core; mounting an end plate to the rotor core such that the end plate abuts against the rotor core in a direction of a rotation axis of the rotor core; and heating the rotor core with the permanent magnet and the end plate mounted to the rotor core.

According to the present invention, the rotor core is heated in the step of heating, with the permanent magnet and the end plate mounted to the rotor core. The thermosetting adhesive is thereby cured, causing the permanent magnet to be fixed to the rotor core. At this time, if only the rotor core is heated, only the amount of heat transmitted from the rotor core is applied to the end plate, and thus the end plate undergoes a smaller amount of thermal expansion, when compared to the case where the entire rotor is heated. If the end plate undergoes a small amount of expansion when a heating operation is performed during manufacturing of the rotor to cure a thermosetting adhesive, then it is possible to reduce compressive stress or tensile stress in a radial direction caused by difference in linear expansion coefficient between the rotor core and the end plate. As a result, if the rotor core is formed of a plurality of stacked magnetic steel sheets, for example, it is possible to prevent deformation of a magnetic steel sheet placed at an end in an axial direction. As such, it is possible to provide a method of manufacturing a rotor, the method reducing stress attributable to an adhesive interposed between the rotor core and the end plate.

Preferably, the end plate is a non-magnetic substance. The step of heating includes the step of generating a magnetic field around the rotor core.

According to the present invention, a magnetic field is generated around the rotor core in the step of heating. When a magnetic field is generated around the rotor core, an eddy current is generated inside the rotor core made of a magnetic substance, based on the generated magnetic field. The generated eddy current produces Joule heat at the rotor core, and thereby the rotor core is heated. If a magnetic field is generated around the end plate, an eddy current is not generated inside the end plate because it is a non-magnetic substance. Therefore only the rotor core can be heated.

More preferably, the step of generating the magnetic field includes the step of generating the magnetic field by supplying power to a coil provided to face the rotor core.

According to the present invention, power is supplied to a coil provided to face the rotor core so as to generate a magnetic field in the step of generating a magnetic field. It is therefore possible to generate a magnetic field around the rotor core. When a magnetic field is generated around the rotor core, an eddy current is generated inside the rotor core made of a magnetic substance, based on the generated magnetic field. The generated eddy current produces Joule heat at the rotor core, and thereby the rotor core is heated. If a magnetic field is generated around the end plate, an eddy current is not generated inside the end plate because it is a non-magnetic substance. Therefore only the rotor core can be heated.

BRIEF DESCRIPTION OF THE DRAWINGS

FIGS. 7A and 7B are (first) views each showing a structure of a convexo-concave portion formed at each of end plates of the rotor according to the second embodiment.

FIG. 8 is a (second) view showing a structure of a convexo-concave portion formed at each of the end plates of the rotor according to the second embodiment.

BEST MODES FOR CARRYING OUT THE INVENTION

Figure 1:
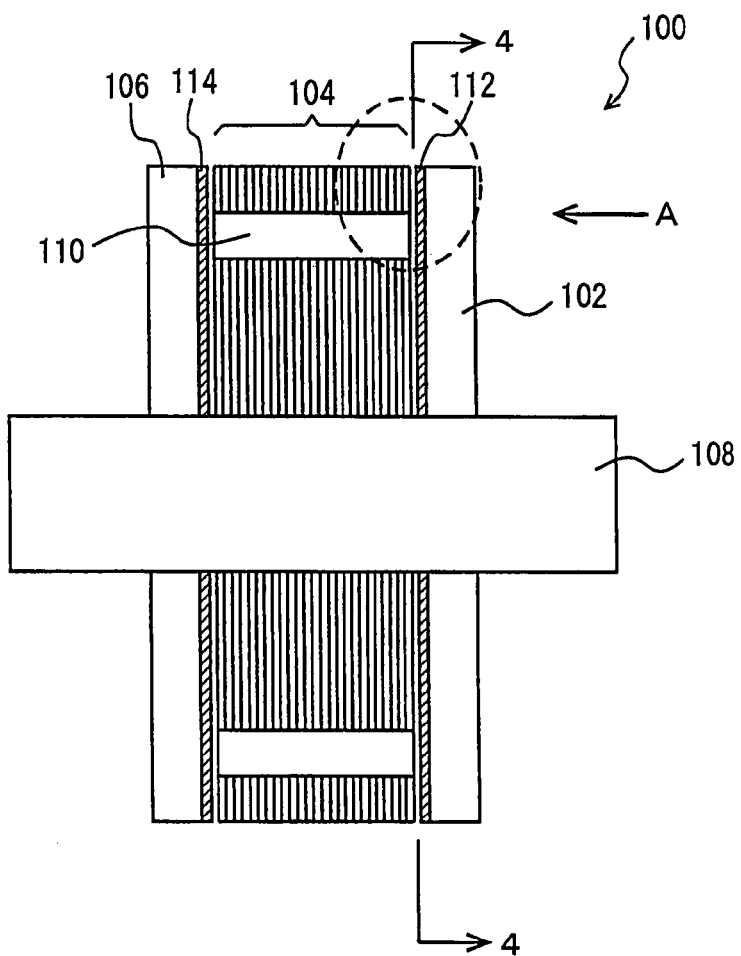
FIG. 1 is a view showing a cross-sectional structure of a rotor according to a first embodiment.

Embodiments of the present invention will hereinafter be described with reference to the drawings. In the description below, the same parts are provided with the same reference characters, and the same parts have the same names and functions. Therefore, the detailed description thereof will not be repeated.

FIRST EMBODIMENT

In the present embodiment, a rotating electrical machine is formed of a rotor and a stator. As shown in FIG. 1, a rotor 100 according to the present embodiment is formed of a shaft 108, a rotor core 104, end plates 102 and 106, a permanent magnet 110, and stainless steel plates 112 and 114.

Rotor core 104 is formed of a plurality of stacked, disc-shaped magnetic steel sheets. Rotor core 104 is provided with a circular opening through which shaft 108 can penetrate rotor core 104. The circular opening is provided with a projection (not shown) for fitting into shaft 108 for positioning. Permanent magnet 110 is inserted into an opening formed along a circumferential direction of rotor core 104. Disc-shaped end plates 102 and 106 are provided to sandwich rotor core 104 in an axial direction of shaft 108. End plates 102 and 106 are made of an aluminum alloy or the like. However, the material of the end plates is not limited thereto as long as the material is a non-magnetic substance.

Permanent magnet 110 is fixed to rotor core 104 with an adhesive. How permanent magnet 110 is mounted to rotor core 104 is not particularly limited. For example, an adhesive may be applied to the opening of rotor core 104 and thereafter permanent magnet 110 may be inserted and mounted thereto. Alternatively, permanent magnet 110 may be inserted into the opening of rotor core 104 and thereafter an adhesive may be applied to the opening of rotor core 104 for fixing the permanent magnet. The adhesive is not particularly limited as long as it has a predetermined viscosity. A thermosetting adhesive is used, for example, in the present embodiment. In the case where the thermosetting adhesive is used, when rotor 100 is heated with the adhesive interposed between permanent magnet 110 and rotor core 104, molecules composing the adhesive are bonded and cured to form a three-dimensional network structure so that permanent magnet 110 is fixed to rotor core 104.

Figure 2:
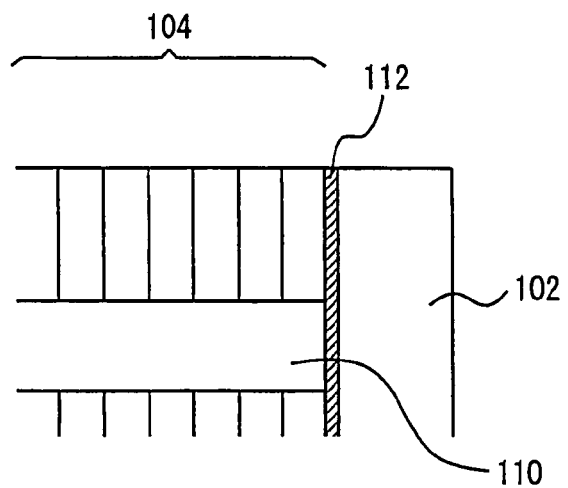
FIG. 2 is an enlarged view of a dotted line portion in FIG. 1.

As shown in FIG. 2, the present invention is characterized in that stainless steel plate 112 is provided as an intermediate member between rotor core 104 and end plate 102.

Stainless steel plate 112 is formed of stainless steel. However, the material thereof is not particularly limited to the stainless steel as long as the material is a non-magnetic substance and has a linear expansion coefficient falling between that of rotor core 104 and that of end plate 102.

In the present embodiment, stainless steel plate 112 may have any shape as long as it blocks the opening into which permanent magnet 110 is inserted. In the present embodiment, stainless steel plate 112 is a disc shape having an outer diameter set such that stainless steel plate 112 extends beyond an outer peripheral position of the opening into which permanent magnet 110 is inserted.

Figure 3:
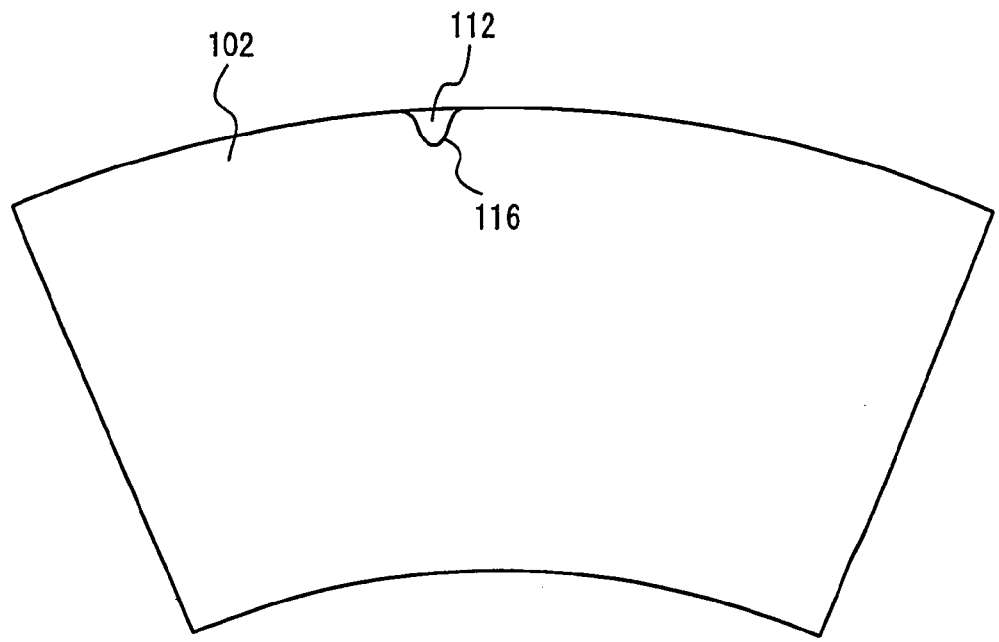
FIG. 3 is a view showing a part of an end plate seen in a direction of an arrow A in FIG. 1.

As shown in FIG. 3, end plate 102 is provided with a notch 116. The shape of notch 116 is not particularly limited to the shape shown in FIG. 3 as long as notch 116 is formed such that a portion placed at an outer periphery of end plate 102 in a circumferential direction and corresponding to notch 116 is formed to be radially inward with respect to an outer periphery of stainless steel plate 112. Preferably, notch 116 has a shape corresponding to a jig that limits the position of end plate 102 during assembly of rotor 100. By doing so, notch 116 allows end plate 102 to be fixed to the jig, and also allows stainless steel plate 112 to be checked as to whether or not it is inserted between rotor core 104 and end plate 102.

Figure 4:
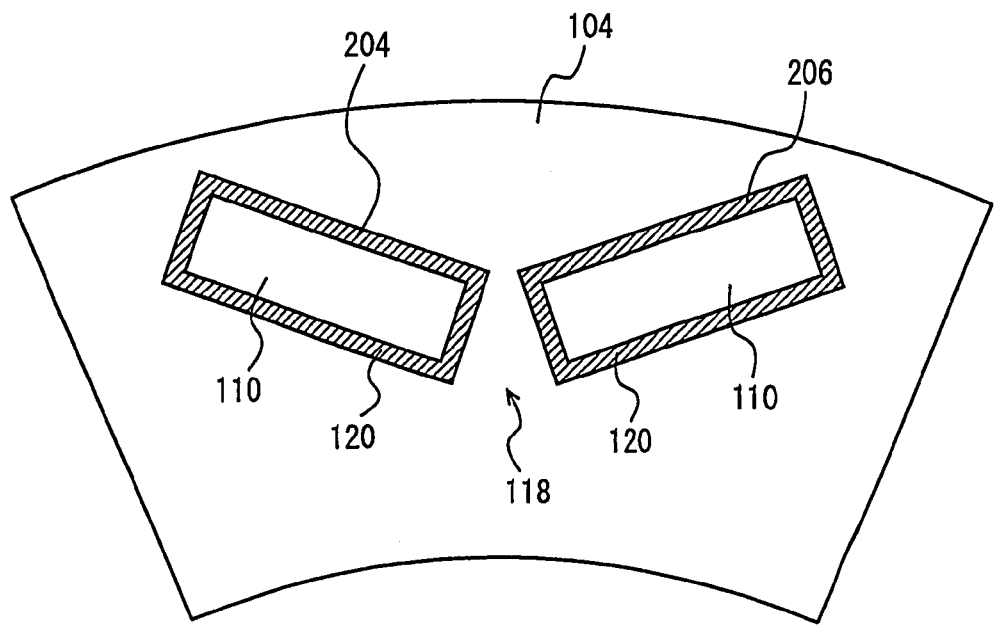
FIG. 4 is a (first) view showing a part of a rotor core having an opening formed therein.

As shown in FIG. 4, rotor core 104 is provided with a plurality of openings 118 along a circumferential direction. In the present embodiment, opening 118 is a pair of openings 204 and 206 provided to be V-shaped. Each of openings 204 and 206 is formed such that permanent magnet 110 can be inserted thereinto. Permanent magnet 110 is fixed to rotor core 104 with a thermosetting adhesive 120.

Figure 5:
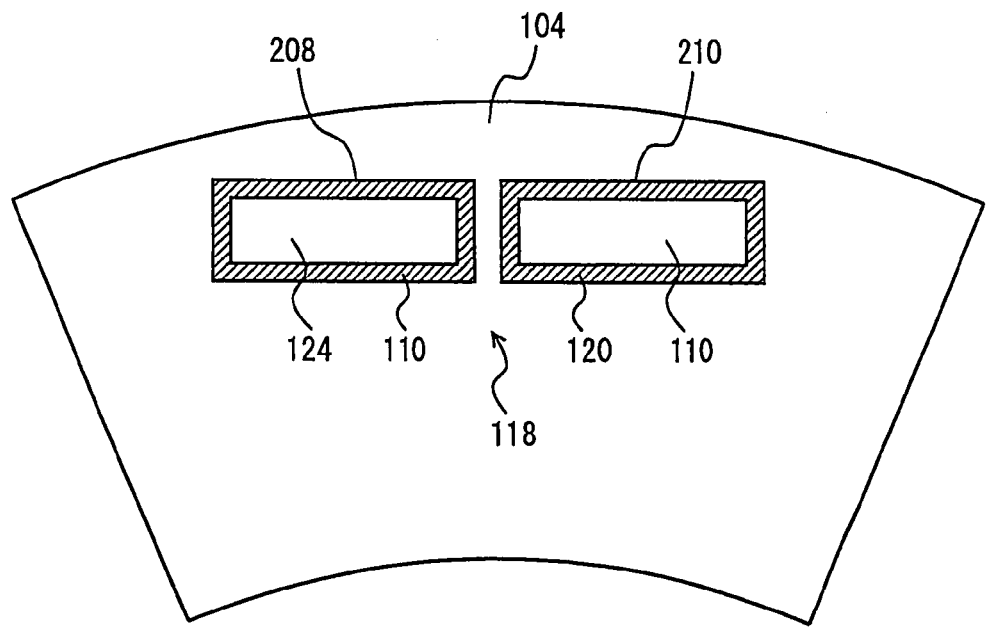
FIG. 5 is a (second) view showing a part of the rotor core having an opening formed therein.

In the present embodiment, although opening 118 is provided such that two openings 204 and 206 are provided to be V-shaped, it is not particularly limited thereto. As shown in FIG. 5, for example, opening 118 may be a pair of openings 208 and 210 each provided along a direction orthogonal to the radial direction of rotor core 104.

The following is a description of an action of rotor 100 in a rotating electrical machine according to the present embodiment based on the structure above. For example, assume that rotor 100 is to be manufactured. During the process for manufacturing rotor 100, end plate 106, stainless steel plate 112, and rotor core 104 are penetrated by shaft 108 to be mounted to shaft 108. A proper amount of thermosetting adhesive 120 is injected into the opening of rotor core 104, and permanent magnet 110 is then inserted into each of openings 204 and 206 in rotor core 104. Furthermore, stainless steel plate 112 and end plate 102 are mounted to rotor core 104. Rotor 100, which has undergone such a mounting process, is heated to cure thermosetting adhesive 120, and thereby permanent magnet 110 is fixed to rotor core 104.

As to rotor 100 in which permanent magnet 110, stainless steel plates 112 and 114, and end plates 102 and 106 are mounted to rotor core 104, if a thermosetting adhesive is not cured, the adhesive can be oozed from the opening of rotor core 104 on at least one of the stainless steel plate 112 side and the stainless steel plate 114 side. In this case, the thermosetting adhesive is interposed between rotor core 104 and each of stainless steel plates 112 and 114.

When rotor 100 is heated under such circumstances, components of rotor 100, namely, rotor core 104, end plates 102 and 106, and stainless steel plates 112 and 114 individually expand with heat.

End plates 102 and 106 are made of an aluminum alloy, and hence they undergo a larger amount of expansion than stainless steel plates 112 and 114, and rotor core 104. An adhesive is not interposed between end plates 102 and 106, and stainless steel plates 112 and 114, respectively, and between end plates 102 and 106, and rotor core 104. Therefore, there is no bonded portion between end plates 102 and 106, and stainless steel plates 112 and 114, respectively, and between end plates 102 and 106, and rotor core 104.

Stainless steel plates 112 and 114 are made of stainless steel, and hence they undergo a larger amount of expansion than rotor core 104, and a smaller amount of expansion than end plates 102 and 106. If a thermosetting adhesive oozed from the opening is interposed between each of stainless steel plates 112 and 114 and rotor core 104, and rotor 100 is heated, then the thermosetting adhesive is cured while stainless steel plates 112 and 114 and rotor core 104 expand.

When the process for heating rotor 100 is completed and the temperature thereof falls, thermally expanded stainless steel plates 112 and 114 and rotor core 104 contract individually. At this time, the thermosetting adhesive is cured while stainless steel plates 112 and 114 and rotor core 104 expand.

Therefore, when stainless steel plates 112 and 114 and rotor core 104 contract, stress is generated between each of stainless steel plates 112 and 114, and rotor core 104, based on a difference in amount of expansion.

Specifically, stainless steel plates 112 and 114 have a larger linear expansion coefficient than rotor core 104, and accordingly undergo a larger amount of expansion than rotor core 104. Stainless steel plates 112 and 114 also undergo a larger amount of contraction when the temperature falls, and hence a tensile stress is generated by rotor core 104 at stainless steel plates 112 and 114 in a radially outward direction, while a compressive stress is generated by stainless steel plates 112 and 114 at rotor core 104 in a radially inward direction.

Stainless steel plates 112 and 114 have a smaller linear expansion coefficient than end plates 102 and 106. Therefore, the stress generated when a thermosetting adhesive is interposed between each of stainless steel plates 112 and 114 and rotor core 104 is smaller than the stress generated when a thermosetting adhesive is interposed between each of end plates 102 and 106 and rotor core 104.

Also assume that the operation of the rotating electrical machine is repeatedly initiated and halted so as to repeatedly allow rotor 100 to generate heat and to be cooled. The stress generated between each of stainless steel plates 112 and 114 and rotor core 104 is also smaller than the stress generated between each of end plates 102 and 106 and rotor core 104 when a thermosetting adhesive is interposed between each of end plates 102 and 106 and rotor core 104.

As described above, according to a structure of a rotor in a rotating electrical machine in accordance with the present embodiment, a stainless steel plate is provided between the rotor core and each of the end plates. Consequently, the stainless steel plate prevents the adhesive that has oozed from the rotor core from attaching to each of the end plates, and hence the rotor core and each of the end plates can be prevented from being bonded together. Moreover, the stainless steel plate has a linear expansion coefficient falling between that of the rotor core and that of the end plates. Therefore, if the stainless steel plate expands with the ambient temperature and heat generated as the rotating electrical machine operates, the stainless steel plate undergoes a smaller amount of expansion than each of the end plates. Accordingly, even if the rotor core and the stainless steel plate are relatively positioned with an adhesive, it is possible to reduce compressive stress or tensile stress in a radial direction generated by a difference in linear expansion coefficient. As a result, if the rotor core is formed of a plurality of stacked magnetic steel sheets, for example, it is possible to reduce deformation of a magnetic steel sheet placed at an end in an axial direction. In addition, an outer periphery of each of the end plates in a circumferential direction has a portion placed to be radially inward with respect to an outer periphery of the stainless steel plate. Therefore, even if each of the end plates is mounted to the rotor core, it is possible to check if the stainless steel plate is provided or not between the rotor core and each of the end plates. As such, it is possible to provide a structure of a rotor in a rotating electrical machine, the structure preventing the stainless steel plate from being mounted in an incorrect manner, and reducing stress attributable to an adhesive interposed between the rotor core and each of the end plates.

Moreover, an outer diameter of the disc-shaped stainless steel plate is set such that the stainless steel plate extends beyond an outer peripheral position of the opening. The opening is therefore covered with the stainless steel plate, which preventing the adhesive that has oozed from the rotor core from attaching to each of the end plates. Accordingly, each of the end plates and the rotor core can be prevented from being bonded together.

Furthermore, since a stainless steel plate, which is formed of stainless steel, namely, a non-magnetic substance, is provided as an intermediate member, it is possible to prevent losses of a magnetic circuit due to magnetic flux leakage, in a direction parallel to the rotation axis, of a permanent magnet provided at the rotor core.

Preferably, it is desirable to form a film at least at a surface of the stainless steel plate on the rotor core side, a coefficient of friction of the film against the adhesive being smaller than that of the stainless steel plate against the adhesive. By doing so, adhesive force of the adhesive to the stainless steel plate is reduced, and it is possible to reduce stress due to bonding between the stainless steel plate and the rotor core. The film formed at the stainless steel plate can be formed of a mold releasing agent such as a silicon-based coating material or a fluorine-based coating material.

More preferably, for the intermediate member to be inserted between each of the end plates and the rotor core, it is preferable to use a material made of a non-magnetic substance having a linear expansion coefficient much closer to that of the magnetic steel sheet. By doing so, the intermediate member undergoes the amount of expansion similar to that of the rotor core. Therefore, even if the intermediate member expands in accordance with the ambient temperature and heat generated by the rotor, it is possible to reduce stress caused at a point fixed with an adhesive.

SECOND EMBODIMENT

The following is a description of a structure of a rotor in a rotating electrical machine according to a second embodiment of the present invention. A structure of a rotor in a rotating electrical machine according to the present embodiment is different from that of the rotor in a rotating electrical machine according to the first embodiment described above, in that rotor 100 includes end plates 300 and 302 instead of end plates 102 and 106 and that rotor 100 does not include stainless steel plates 112 and 114. The remaining components are the same as those of the structure of a rotor in a rotating electrical machine according to the first embodiment described above, and provided with the same reference characters and same functions. Therefore, the detailed description thereof will not be repeated here.

Figure 6:
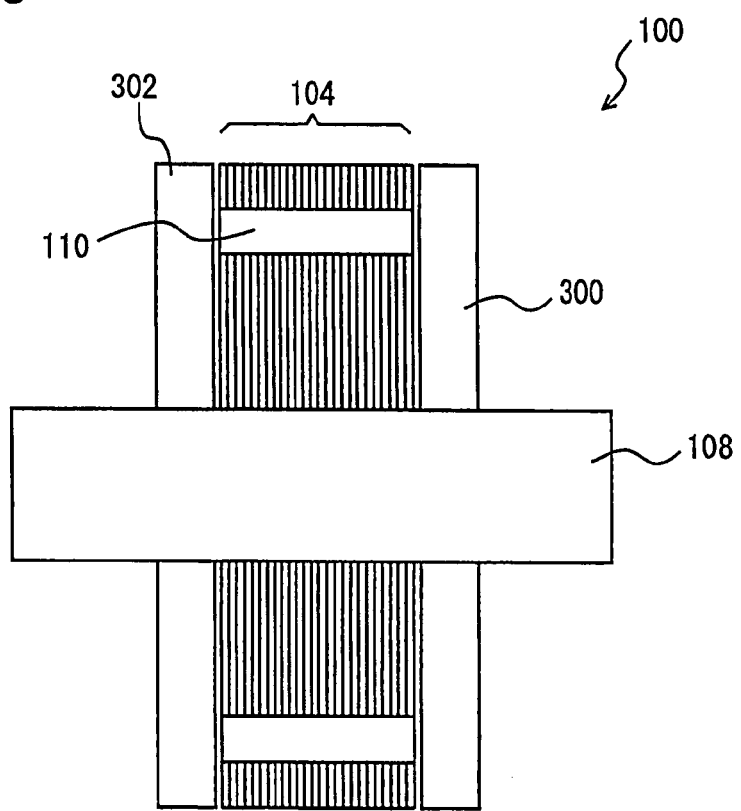
FIG. 6 is a view showing a cross-sectional structure of a rotor according to a second embodiment.

In the present embodiment, a rotating electrical machine is formed of a rotor and a stator. As shown in FIG. 6, rotor 100 according to the present embodiment is formed of shaft 108, rotor core 104, end plates 300 and 302, and permanent magnet 110.

A structure of the rotor in a rotating electrical machine according to the present embodiment is characterized in that a convexo-concave portion is formed at each of the surfaces of end plates 300 and 302 on a side where each of end plates 300 and 302 abuts against rotor core 104.

In other words, as shown in FIG. 7A, an annular groove 304 is formed at a surface of end plate 300 on a side where end plate 300 abuts against rotor core 104, along a circumferential direction of end plate 300. As shown in cross section of end plate 300 in FIG. 7B, three grooves including groove 304 are formed at end plate 300 at predetermined intervals in a radial direction from a rotation axis, respectively. The number of grooves is not particularly limited to three. Grooves are also formed at end plate 302 along a circumferential direction on a side where end plate 302 abuts against rotor 104 just as in end plate 300. Therefore, the detailed description thereof will not be repeated.

Figure 9A:
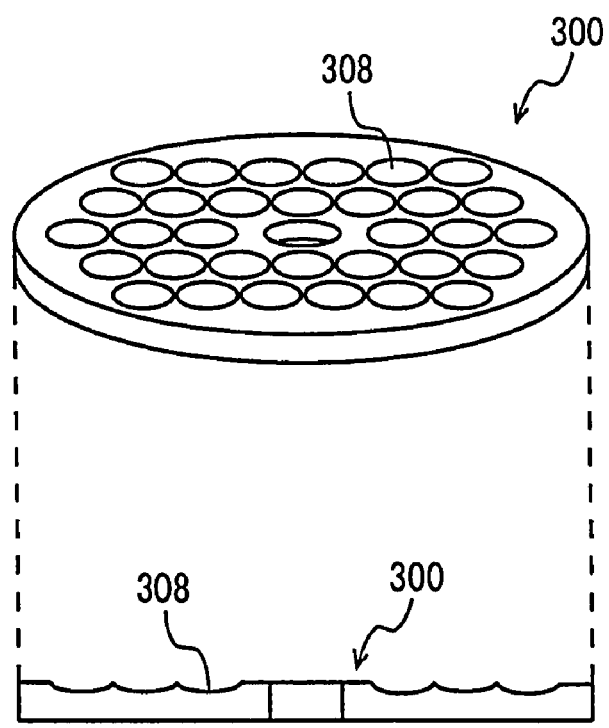
FIGS. 9A and 9B are (third) views each showing a structure of a convexo-concave portion formed at each of the end plates of the rotor according to the second embodiment.
Figure 9B:
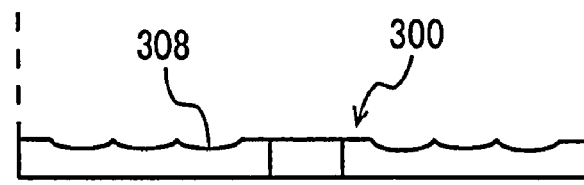

As to the convexo-concave portion formed at each of end plates 300 and 302 is not particularly limited to a groove formed along a circumferential direction. In other words, a plurality of grooves 306 may be formed at a surface of end plate 300 on a side where end plate 300 abuts against rotor core 104 such that grooves 306 extend radially from the center, namely, the rotation axis, as shown in FIG. 8. Alternatively, a circular concave portion 308 may be formed at a surface of end plate 300 on the side where end plate 300 abuts against rotor core 104, as shown in FIG. 9A. The shape of concave portion 308 is not particularly limited, and may have an arc shape, for example, as shown in a cross section of end plate 300 in FIG. 9B.

The following is a description of an action of rotor 100 in a rotating electrical machine according to the present embodiment based on the structure above. For example, assume that rotor 100 is to be manufactured. During the process for manufacturing rotor 100, end plate 302 and rotor core 104 are penetrated by shaft 108 to be mounted to shaft 108. A proper amount of thermosetting adhesive 120 is injected into the opening of rotor core 104, and then permanent magnet 110 is inserted into each of openings 204 and 206 in rotor core 104. Furthermore, end plate 300 is mounted to rotor core 104. Rotor 100, which has undergone such a mounting process, is heated to cure thermosetting adhesive 120, and thereby permanent magnet 110 is fixed to rotor core 104.

As to rotor 100 in which permanent magnet 110 and end plates 300 and 302 are mounted to rotor core 104, if a thermosetting adhesive is not cured, the adhesive can be oozed from the opening of rotor core 104 on at least one of the end plate 300 side and the end plate 302 side. In this case, the thermosetting adhesive is interposed between rotor core 104 and each of end plates 300 and 302.

When rotor 100 is heated under such circumstances, components of rotor 100, namely, rotor core 104, and end plates 300 and 302 individually expand with heat.

End plates 300 and 302 are made of an aluminum alloy, and hence they undergo a larger amount of expansion than rotor core 104. If a thermosetting adhesive oozed from the opening is interposed between each of end plates 300 and 302 and rotor core 104, and rotor 100 is heated, then the thermosetting adhesive is cured while end plates 300 and 302 and rotor core 104 expand.

When the heating process is completed and the temperature of rotor 100 falls, thermally expanded end plates 300 and 302 and rotor core 104 contract individually. At this time, the thermosetting adhesive is cured while end plates 300 and 302 and rotor core 104 expand. Therefore, when end plates 300 and 302 and rotor core 104 contract, stress is generated between each of end plates 300 and 302 and rotor core 104, based on a difference in amount of expansion.

Specifically, end plates 300 and 302 have a larger linear expansion coefficient than rotor core 104, and accordingly undergo a larger amount of expansion than rotor core 104. End plates 300 and 302 also undergo a larger amount of contraction when the temperature falls, and hence a tensile stress in a radially outward direction is generated by rotor core 104 at end plates 300 and 302, while a compressive stress in a radially inward direction is generated by end plates 300 and 302 at rotor core 104.

A convexo-concave portion is formed at each of end plates 300 and 302 at a surface abutting against rotor core 104. A contact area of each of end plates 300 and 302 against rotor core 104 is therefore smaller when compared to the case where a convexo-concave portion is not formed at each of end plates 300 and 302. Therefore, an area where each of end plates 300 and 302 is bonded to rotor core 104 with a thermosetting adhesive is small. Reduction in area where each of the end plates and the rotor core are bonded together leads to reduction in adhesive force of an adhesive between each of end plates 300 and 302 and rotor core 104, and thereby stress caused between each of end plates 300 and 302 and rotor core 104 is smaller when compared to the case where a convexo-concave portion is not formed at each of end plates 300 and 302.

Also assume that the operation of the rotating electrical machine is repeatedly initiated and halted so as to repeatedly allow rotor 100 to generate heat and to be cooled. The stress caused between each of end plates 300 and 302 and rotor core 104 is also smaller when compared to the case where a convexo-concave portion is not formed at each of end plates 300 and 302.

As described above, according to a structure of a rotor in a rotating electrical machine in accordance with the present embodiment, when a groove is formed at each of the end plates at a surface facing the rotor core, a contact area between each of the end plates and the rotor core can be reduced. Therefore, even if each of the end plates is fixed to the rotor core with an adhesive, it is possible to reduce an area where each of the end plates is bonded to the rotor core, because of the reduction in contact area. Reduction in an area where each of the end plates is bonded to the rotor core leads to reduction in adhesive force between each of the end plates and the rotor core. It is therefore possible to reduce compressive stress or tensile stress in a radial direction cased by a difference in linear expansion coefficient between the end plates and the rotor core both expanding with the ambient temperature and heat generated as a rotating electrical machine operates. As a result, if the rotor core is formed of a plurality of stacked magnetic steel sheets, for example, significant deformation of the magnetic steel sheets can be prevented. As such, it is possible to provide a structure of a rotor in a rotating electrical machine, the structure reducing stress attributable to an adhesive interposed between the rotor core and each of the end plates.

Furthermore, each of the end plates is formed of an aluminum alloy, namely, a non-magnetic substance, and thereby it is possible to prevent losses of a magnetic circuit due to magnetic flux leakage, in a direction parallel to a rotation axis, of a permanent magnet provided at a rotor core.

THIRD EMBODIMENT

The following is description of a method of manufacturing a rotor according to a third embodiment. The method of manufacturing a rotor according to the present embodiment is a method of manufacturing a rotor having a rotor structure according to the above-described first or second embodiment.

Components of a rotor in a rotating electrical machine according to the present embodiment are different from those in the structure of the rotor in a rotating electrical machine according to the first embodiment, in that rotor 100 does not contain stainless steel plates 112 and 114. The remaining components are similar to those of rotor 100 in a rotating electrical machine according to the first embodiment, and are provided with the same reference characters and the same functions. Therefore, the detailed description thereof will not be repeated here.

The method of manufacturing a rotor according to the present embodiment is characterized in that rotor core 104 to which permanent magnet 110 and end plates 102 and 106 have been mounted is heated to cure a thermosetting adhesive.

Figure 10:
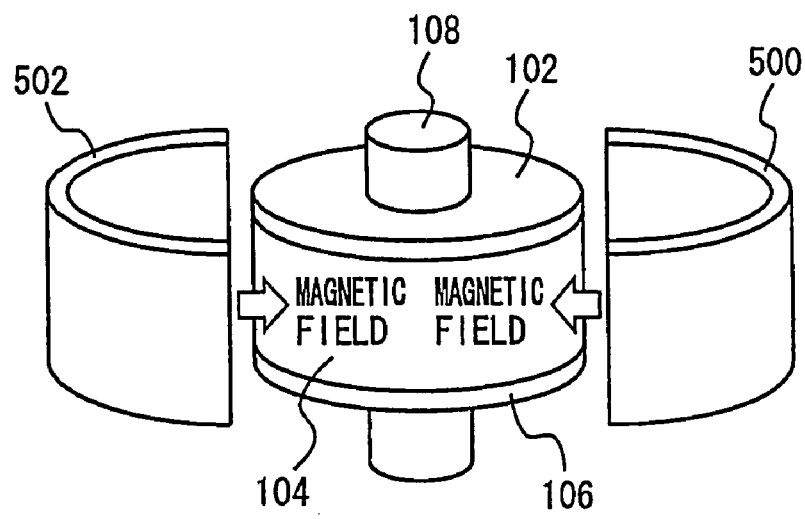
FIG. 10 is a view showing a structure of a coil for heating the rotor core in a method of manufacturing a rotor according to a third embodiment.

Specifically, as shown in FIG. 10, coils 500 and 502 are provided to face rotor core 104 to generate a magnetic field around rotor core 104. Rotor core 104 is formed of a plurality of stacked magnetic steel sheets, which are a magnetic substance. Therefore, if a magnetic field is generated around rotor core 104, an eddy current is generated inside rotor core 104, based on the generated magnetic field. When an eddy current is generated inside rotor core 104, Joule heat is produced, and thereby rotor core 104 is heated.

Figure 11:
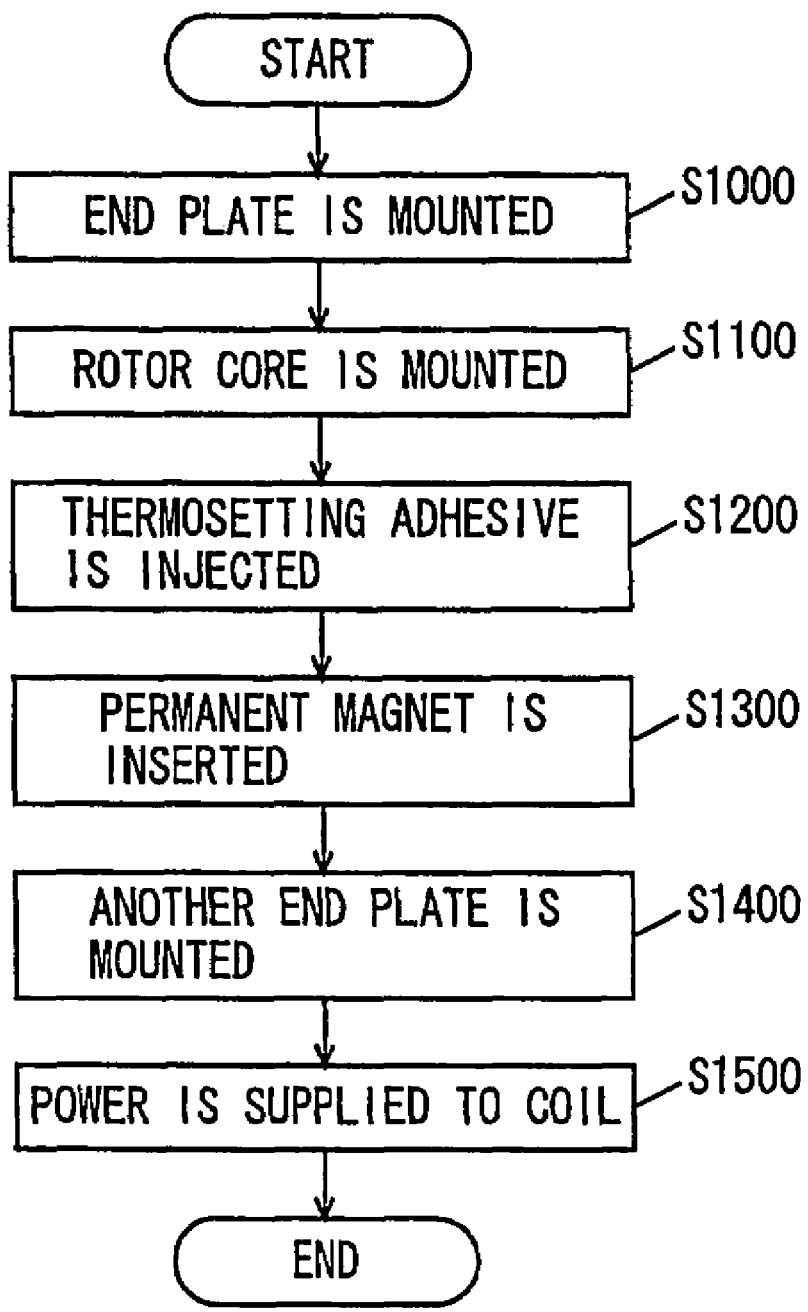
FIG. 11 is a view showing a procedure of the method of manufacturing a rotor according to the third embodiment.

The following is a description of a method of manufacturing a rotor according to the present embodiment with reference to FIG. 11.

In step (hereinafter referred to as S) 1000, end plate 106 is mounted to shaft 108. In S1100, rotor core 104 is mounted to end plate 106 that has been mounted to shaft 108.

In S1200, a proper amount of thermosetting adhesive is injected into the opening formed in rotor core 104. In S1300, permanent magnet 110 is inserted into the opening formed in rotor core 104.

In S1400, end plate 102 is mounted to rotor core 104 such that end plate 102 abuts against an end face of rotor core 104 in an axial direction. End plates 102 and 106 may be mounted to rotor core 104 by fastening a bolt (not shown) penetrating end plates 102 and 106 and rotor core 104.

In S1500, power is supplied to coils 500 and 502 to generate a magnetic field around rotor 100. How power is supplied to coils 500 and 502 is not particularly limited; power supply may be halted when a predetermined time period has passed, or alternatively, power supply may be halted after the temperature of rotor core 104 reaches or exceeds a curing temperature of the thermosetting adhesive.

The following is a description of an effect of a method of manufacturing a rotor according to the present embodiment based on the above-described structure and a flowchart.

End plate 106 and rotor core 104 are mounted to shaft 108 (S1000, S1100), a thermosetting adhesive is injected into an opening of rotor core 104 (S1200), and permanent magnet 110 is inserted into the opening of rotor core 104 (S1300). When end plate 102 is mounted to rotor core 104 such that end plate 102 abuts against an end face of rotor core 104 in an axial direction (S1400), and power is then supplied to coils 500 and 502 (S1500), an eddy current is generated inside rotor core 104 based on a magnetic field generated around rotor core 104. Joule heat produced thereby causes temperature rise in rotor core 104. When the temperature of rotor core 104 rises, and the temperature of thermosetting adhesive 120 applied to rotor core 104 exceeds a temperature at which the thermosetting adhesive starts to cure, thermosetting adhesive 120 starts to cure. At this time, since end plates 102 and 106 are formed of an aluminum alloy, namely, a non-magnetic substance, an eddy current is not generated inside end plates 102 and 106 even if a magnetic field is generated around rotor 100. Therefore, end plates 102 and 106 generate no heat on their own, and only a heat transmitted from rotor core 104 causes the temperature rise in end plates 102 and 106.

At this time, end plates 102 and 106 thermally expand with a heat transmitted from rotor core 104. However, end plates 102 and 106 undergo a smaller amount of expansion when compared to the case where the entire rotor 100 is heated. Accordingly, when rotor core 104 is heated to cure a thermosetting adhesive, end plates 102 and 106 undergo a smaller amount of expansion when compared to the case where the entire rotor 100 is heated.

When power supply to coils 500 and 502 is halted and the temperature of rotor core 104 falls, end plates 102 and 106, which has undergone a smaller amount of expansion, also undergo a smaller amount of contraction. Therefore, even if there is a point fixed with a thermosetting adhesive between rotor core 104 and each of end plates 102 and 106, stress caused at the fixed point is smaller when compared to the case where the entire rotor 100 is heated to cure a thermosetting adhesive.

As described above, according to the method of manufacturing a rotor in accordance with the present embodiment, a permanent magnet and end plates are mounted to the rotor core and then power is supplied to a coil provided to face the rotor core so that a magnetic field is generated. By doing so, a magnetic field can be generated around the rotor core. When a magnetic field is generated around the rotor core, an eddy current is generated inside the rotor core, based on the generated magnetic field. The generated eddy current produces Joule heat at the rotor core, and thereby the rotor core is heated. Since the end plates are a non-magnetic substance, an eddy current is not generated inside them even if a magnetic field is generated around them. It is therefore possible to heat only the rotor core. Since only the rotor core is heated, only the amount of heat transmitted from the rotor core is applied to the end plates, and hence the end plates undergo a smaller amount of thermal expansion when compared to the case where the entire rotor is heated. Therefore, the end plates undergo a smaller amount of expansion during a heating process for curing a thermosetting adhesive in manufacturing a rotor. It is therefore possible to reduce compressive stress or tensile stress in a radial direction generated by a difference in linear expansion coefficient between the rotor core and each of the end plates. As a result, if the rotor core is formed of a plurality of stacked magnetic steel sheets, for example, significant deformation of the magnetic steel sheets can be prevented. As such, it is possible to provide a method of manufacturing a rotor, the method reducing stress attributable to an adhesive interposed between the rotor core and each of the end plates.

It should be understood that all the embodiments disclosed here are by way of illustration and examples only and are not to be taken by way of limitation. It is intended that the scope of the present invention is indicated not by the description above, but by the appended claims, and that all the modifications that falls within the meaning and range of equivalents of the claims are embraced.

The invention claimed is:

1. A structure of a rotor in a rotating electrical machine having the rotor and a stator, wherein said rotor includes a rotor core, a permanent magnet inserted into an opening formed along a circumferential direction of said rotor core, and end plates provided to sandwich said rotor core in a direction of a rotation axis, said permanent magnet being fixed to said rotor core with an adhesive, an intermediate member is provided between said rotor core and each of said end plates, the intermediate member having a linear expansion coefficient falling between a linear expansion coefficient of said rotor core and a linear expansion coefficient of said end plates, and an outer periphery of each of said end plates in said circumferential direction has a portion placed to be radially inward with respect to an outer periphery of said intermediate member.

2. The structure of the rotor in a rotating electrical machine according to claim 1, wherein said intermediate member is disc-shaped, and an outer diameter of said intermediate member is set such that the intermediate member extends beyond an outer peripheral position of said opening.

3. The structure of the rotor in a rotating electrical machine according to claim 1, wherein said intermediate member is a non-magnetic substance.

4. The structure of the rotor in a rotating electrical machine according to claim 3, wherein said intermediate member is formed of stainless steel.

5. The structure of the rotor in a rotating electrical machine according to claim 1, wherein a film is formed at least at a surface of said intermediate member on a side where the rotor core is placed, a coefficient of friction of said film against said adhesive being smaller than a coefficient of friction of said intermediate member against said adhesive.

6. The structure of the rotor in a rotating electrical machine according to claim 1, wherein each of said end plates is a non-magnetic substance.

7. The structure of the rotor in a rotating electrical machine according to claim 1, wherein said rotor core is formed of a plurality of stacked magnetic steel sheets.

8. The structure of the rotor in a rotating electrical machine according to claim 1, wherein said opening is a pair of openings provided to be V-shaped.

9. The structure of the rotor in a rotating electrical machine according to claim 1, wherein said opening is a pair of openings each provided along a direction orthogonal to a radial direction.

* * * * *